United States Patent
Yasuda et al.

(10) Patent No.: US 6,708,070 B2
(45) Date of Patent: Mar. 16, 2004

(54) METHOD FOR PREPARING MANUFACTURING PLAN AND METHOD FOR MANUFACTURING SEMICONDUCTOR PRODUCTS USING THE MANUFACTURING PLAN

(75) Inventors: Chigusa Yasuda, Itami (JP); Akira Hamasaki, Itami (JP)

(73) Assignees: Mitsubishi Denki Kabushiki Kaisha, Tokyo (JP); Ryoden Semiconductor System Engineering Corporation, Itami (JP)

( * ) Notice: Subject to any disclaimer, the term of this patent is extended or adjusted under 35 U.S.C. 154(b) by 98 days.

(21) Appl. No.: 10/135,419

(22) Filed: May 1, 2002

(65) Prior Publication Data

US 2003/0093177 A1 May 15, 2003

(30) Foreign Application Priority Data

Nov. 12, 2001 (JP) ........................ 2001-346271

(51) Int. Cl.⁷ .............................................. G06F 19/00
(52) U.S. Cl. .......................... 700/97; 700/95; 700/121; 700/213
(58) Field of Search ........................... 700/213, 95, 97, 700/99, 103, 121; 414/935

(56) References Cited

U.S. PATENT DOCUMENTS

| | | | | |
|---|---|---|---|---|
| 5,544,350 A | * | 8/1996 | Hung et al. ................. | 716/19 |
| 5,889,673 A | * | 3/1999 | Pan et al. ..................... | 700/97 |
| 6,198,980 B1 | * | 3/2001 | Costanza ..................... | 700/99 |
| 6,263,253 B1 | * | 7/2001 | Yang et al. .................... | 700/99 |
| 6,353,769 B1 | * | 3/2002 | Lin ............................. | 700/101 |
| 6,622,055 B2 | * | 9/2003 | Fan et al. ..................... | 700/99 |

FOREIGN PATENT DOCUMENTS

| | | |
|---|---|---|
| JP | 4-176546 | 6/1992 |
| JP | 11-267951 | 10/1999 |

\* cited by examiner

*Primary Examiner*—Khoi H. Tran
(74) *Attorney, Agent, or Firm*—Leydig,Voit & Mayer, Ltd.

(57) ABSTRACT

A method for preparing a manufacturing plan for a manufacturing factory having multiple equipments and charged with multiple processes. The equipment is assigned to the processes to determine an operation pattern for a day. A load of each process is allotted among the equipment assigned to the process. Total load of each equipment is calculated by summing the allotted load. A capability index of each equipment is determined by dividing capacity of the equipment by the total load of the equipment. The capability index is multiplied by the allotted load to provide a feasible load of the equipment for the process. By summing the feasible load of each equipment, a total feasible load under the operation pattern is calculated for each process. By comparing the total feasible load with the load for each process, the operation pattern is determined whether acceptable or not.

5 Claims, 10 Drawing Sheets

| manufacturing process | | P1 | P2 | P3 | P4 |
|---|---|---|---|---|---|
| required lots | | 50 | 50 | 100 | 150 |
| processing time (per lot) | | 30 | 60 | 15 | 10 |
| work load | | 1500 | 3000 | 1500 | 1500 |
| M1 | assignment | ✓ | ✓Q | | ✓ |
| M1 | load | 1250 | 500 ← | | 750 |
| M1 | capability index | 1.152 | 576 | | 864 |
| M2 | assignment | | | ✓ | |
| M2 | load | 1500 | | 1500 | |
| M2 | capability index | 0.96 | | 1440 | |
| M3 | assignment | | | ✓ | ✓ ✓ |
| M3 | load | 3000 | | 1500 | 750 750 |
| M3 | capability index | 0.48 | | 720 | 360 360 |
| M4 | assignment | | ✓ | | |
| M4 | load | 500 | 500 ← | ↙R | |
| M4 | capability index | 2.88 | 1440 | | |
| M5 | assignment | | ✓ | | ✓ |
| M5 | load | 1250 | 500 ← | | 750 |
| M5 | capability index | 1.152 | 576 | | 864 |
| feasible load | | 2592 ← | 2160 | 1224 | 1224 |
| feasible lots | | 86.4 | 36 | 81.6 | 122.4 |
| manufacturing process | | P1 | P2 | P3 | P4 |

FIG. 1

| | | manufacturing process | | | |
|---|---|---|---|---|---|
| | | P1 | P2 | P3 | P4 |
| manufacturing equipment | M1 | ✓ | n/a | | ✓ |
| | M2 | | ✓ | n/a | n/a |
| | M3 | n/a | ✓ | ✓ | ✓ |
| | M4 | ✓ | | | n/a |
| | M5 | ✓ | n/a | ✓ | |

FIG. 2

| manufacturing process | | | P1 | P2 | P3 | P4 |
|---|---|---|---|---|---|---|
| | required lots | | 50 | 50 | 100 | 150 |
| | processing time (per lot) | | 30 | 60 | 15 | 10 |
| | work load | | 1500 | 3000 | 1500 | 1500 |
| manufacturing equipment | M1 | assignment | ✓ | ✓ Q | | ✓ |
| | | load 1250 | 500 | | | 750 |
| | | capability index 1.152 | 576 | | | 864 |
| | M2 | assignment | | ✓ | | |
| | | load 1500 | | 1500 | | |
| | | capability index 0.96 | | 1440 | | |
| | M3 | assignment | | | ✓ | ✓ | ✓ |
| | | load 3000 | | 1500 | 750 | 750 |
| | | capability index 0.48 | | 720 | 360 | 360 |
| | M4 | assignment | ✓ | ✓ R | | |
| | | load 500 | 500 | | | |
| | | capability index 2.88 | 1440 | | | |
| | M5 | assignment | ✓ | | ✓ | |
| | | load 1250 | 500 | | 750 | |
| | | capability index 1.152 | 576 | | 864 | |
| | feasible load | | 2592 | 2160 | 1224 | 1224 |
| | feasible lots | | 86.4 | 36 | 81.6 | 122.4 |
| manufacturing process | | | P1 | P2 | P3 | P4 |

FIG. 4

| manufacturing process | | | P1 | P2 | P3 | P4 |
|---|---|---|---|---|---|---|
| required lots | | | 50 | 50 | 100 | 150 |
| processing time (per lot) | | | 30 | 60 | 15 | 10 |
| work load | | | 1500 | 3000 | 1500 | 1500 |
| manufacturing equipment | M1 | assignment | ✓ | | | ✓ |
| | | load  1250 | 500 | | | 750 |
| | | capability index  1.152 | 576 | | | 864 |
| | M2 | assignment | | ✓ | | |
| | | load  1500 | | 1500 | | |
| | | capability index  0.96 | | 1440 | | |
| | M3 | assignment | | | ✓ | ✓ |
| | | load  1500 | | | 750 | 750 |
| | | capability index  0.96 | | | 720 | 720 |
| | M4 | assignment | ✓ | ✓ | | |
| | | load  2000 | 500 | 1500 | | |
| | | capability index  0.72 | 360 | 1080 | | |
| | M5 | assignment | ✓ | | ✓ | |
| | | load  1250 | 500 | | 750 | |
| | | capability index  1.152 | 576 | | 864 | |
| feasible load | | | 1512 | 2520 | 1584 | 1584 |
| feasible lots | | | 50.4 | 42 | 105.6 | 158.4 |
| manufacturing process | | | P1 | P2 | P3 | P4 |

FIG. 5

| | | manufacturing process | | | |
| --- | --- | --- | --- | --- | --- |
| | | P1 | P2 | P3 | P4 |
| manufacturing equipment | M1 | ✓ 1 | n/a | | ✓ 2 |
| | M2 | | ✓ 2 | n/a | n/a |
| | M3 | n/a | ✓ 1 | ✓ 1 | ✓ 1 |
| | M4 | ✓ 2 | | | n/a |
| | M5 | ✓ 2 | n/a | ✓ 2 | |

FIG. 6

| manufacturing process | | | P1 | P2 | P3 | P4 |
|---|---|---|---|---|---|---|
| required lots | | | 50 | 50 | 100 | 150 |
| processing time (per lot) | | | 30 | 60 | 15 | 10 |
| work load | | | 1500 | 3000 | 1500 | 1500 |
| manufacturing equipment | M1 | assignment | | ✓ | | ✓ |
| | | load 1300 | | 300 | | 1000 |
| | | capability index 1.108 | | 332.3 | | 1107.7 |
| | M2 | assignment | | ✓ | | |
| | | load 2000 | | 2000 | | |
| | | capability index 0.72 | | 1440 | | |
| | M3 | assignment | | | ✓ | ✓ | ✓ |
| | | load 2000 | | | 1000 | 500 | 500 |
| | | capability index 0.72 | | | 720 | 360 | 360 |
| | M4 | assignment | ✓ | | | |
| | | load 600 | 600 | | | |
| | | capability index 2.4 | 1440 | | | |
| | M5 | assignment | ✓ | | ✓ | |
| | | load 1600 | 600 | | 1000 | |
| | | capability index 0.9 | 540 | | 900 | |
| feasible load | | | 2312.3 | 2160 | 1260 | 1467.7 |
| feasible lots | | | 77.1 | 36 | 84 | 146.8 |
| manufacturing process | | | P1 | P2 | P3 | P4 |

FIG. 7(a)

|  | manufacturing process | | | |
|---|---|---|---|---|
|  | P1 | P2 | P3 | P4 |
| 1st day | 50.4 | 42 | 105.6 | 158.4 |
| 2nd day | 50.4 | 42 | 105.6 | 158.4 |
| 3rd day | 50.4 | 42 | 105.6 | 158.4 |
| 4th day | 50.4 | 42 | 105.6 | 158.4 |
| total | 201.6 | 168 | 422.4 | 633.6 |
| required lots | 200 | 200 | 400 | 600 |

FIG. 7(b)

|  | manufacturing process | | | |
|---|---|---|---|---|
|  | P1 | P2 | P3 | P4 |
| 1st day | 50.4 | 42 | 105.6 | 158.4 |
| 2nd day | 50.4 | 42 | 105.6 | 158.4 |
| 3rd day | 43.4 | 56 | 86.9 | 123.4 |
| 4th day | 43.4 | 56 | 86.9 | 123.4 |
| total | 187.6 | 196 | 385.0 | 563.6 |
| required lots | 200 | 200 | 400 | 600 |

FIG. 8

| manufacturing process | | | | P1 | P2 | P3 | P4 |
|---|---|---|---|---|---|---|---|
| required lots | | | | 50 | 50 | 100 | 150 |
| processing time (per lot) | | | | 30 | 60 | 15 | 10 |
| work load | | | | 1500 | 3000 | 1500 | 1500 |
| manufacturing equipment | M1 | assignment | | ✓ | | ✓ | ✓ |
| | | load | 1750 | 500 | | 500 | 750 |
| | | capability index | 0.823 | 411.4 | | 411.4 | 617.1 |
| | M2 | assignment | | | ✓ | | |
| | | load | 1000 | | 1000 | | |
| | | capability index | 1.44 | | 1440 | | |
| | M3 | assignment | | | ✓ | ✓ | |
| | | load | 1500 | | 1000 | 500 | |
| | | capability index | 0.96 | | 960 | 480 | |
| | M4 | assignment | | ✓ | ✓ | | |
| | | load | 1500 | 500 | 1000 | | |
| | | capability index | 0.96 | 480 | 960 | | |
| | M5 | assignment | | ✓ | | ✓ | ✓ |
| | | load | 1750 | 500 | | 500 | 750 |
| | | capability index | 0.823 | 411.4 | | 411.4 | 617.1 |
| feasible load | | | | 1302.9 | 3360 | 1302.9 | 1234.3 |
| feasible lots | | | | 43.4 | 56 | 86.9 | 123.4 |
| manufacturing process | | | | P1 | P2 | P3 | P4 |

FIG. 10

| | | manufacturing process | | | |
|---|---|---|---|---|---|
| | | P1 | P2 | P3 | P4 |
| manufacturing equipment | M1 | applicable | n/a | applicable | applicable |
| | M2 | applicable | applicable | n/a | n/a |
| | M3 | n/a | applicable | applicable | applicable |
| | M4 | applicable | applicable | applicable | n/a |
| | M5 | applicable | n/a | applicable | applicable |

METHOD FOR PREPARING MANUFACTURING PLAN AND METHOD FOR MANUFACTURING SEMICONDUCTOR PRODUCTS USING THE MANUFACTURING PLAN

BACKGROUND OF THE INVENTION

The present invention relates to preparing of a manufacturing plan in a factory and, more particularly, to a method for preparing a manufacturing plan to thereby determine assignment of each of a plurality of manufacturing equipments to each of a plurality of manufacturing processes in a factory in which these manufacturing equipments are used in these manufacturing processes.

There have been proposed a few methods of preparing a production plan or of production management for securely achieving a predetermined amount of production by a delivery date by effectively utilizing the facilities in a factory.

For example, Japanese Unexamined Patent Publication No. Hei. 4-176546 discloses a production management method to assure a required product output by a delivery date. In the method of this publication, a target amount necessary to achieve the production of the required amount by the delivery date is set and, if an actual completed amount of production falls short of this target amount, an alarm will be output.

In addition, Japanese Unexamined Patent Publication No. Hei. 11-267951 proposes a method for preparing a production plan for a manufacturing factory wherein facilities thereof are desired to be continuously operated around the clock. According to this production plan preparing method of Japanese Unexamined Patent Publication No. Hei. 11-267951, in a predetermined production period (e.g., one week), first the facilities are operated continuously to accelerate the production and then stop the facilities in the latter part of the production period, thus restricting the number of stopping times of the operation of the facilities to one time for each production period.

Incidentally, each factory is usually provided with a plurality of manufacturing equipments, each of which is available for a plurality of manufacturing processes in many cases. Such an example is shown in FIG. 10. In the example of FIG. 10, a manufacturing equipment M1 is available for manufacturing processes P1, P3, and P4, while a manufacturing equipment M2 is available for manufacturing processes P1 and P2.

In such a case, the capability of the factory for processing each manufacturing process depends on how to assign each of the manufacturing equipment to the manufacturing processes, that is, for which manufacturing processes manufacturing equipments are available. Furthermore, in other words, the assignment of each manufacturing equipment must be determined so as to match the load of each manufacturing process by, for example, assigning more manufacturing equipments to a manufacturing process having a larger load.

However, neither of the above-mentioned production management method disclosed in Japanese Unexamined Patent Publication No. Hei. 4-176546 and the production plan preparing method disclosed in Japanese Unexamined Patent Publication No. Hei. 11-267951 takes into account the assignment of the manufacturing equipment to each of the manufacturing processes, so that capability for each manufacturing process is always constant. Therefore, they cannot accommodate a factory in which a large variety of products are manufactured and the load on each manufacturing process fluctuates with a customer's order for each product, as in today's semiconductor manufacturing factory, thus being deficient in versatility as methods for production management and production plan preparation.

Further, they do not take into account a fluctuation in load and capability and so cannot know previously at which of a plurality of manufacturing processes an imbalance between load and throughput becomes significant, thus finding it difficult to utilize the manufacturing equipment efficiently. There is, therefore, a need to preserve rather a lot of semi-finished products in process in order not to stop the manufacturing equipment, which is often accompanied by an awkward situation in which assignment of the manufacturing equipment is changed only after an imbalance occurs between load and throughput.

SUMMARY OF THE INVENTION

It is an object of the present invention to assign, in a manufacturing factory provided with a plurality of manufacturing processes and a plurality of manufacturing equipments, each of the equipment to these processes according to the work load of each process, thereby utilizing the manufacturing equipments effectively to process the work load.

It is another object of the present invention to comprehend previously about the throughput capability for each manufacturing process and the work load of the day to thereby enable deciding adoption or rejection of further loading and also discussing how to cope with overload previously.

To achieve the above objects, therefore, in a manufacturing factory charged with a plurality of manufacturing processes and having a plurality of manufacturing equipments each of which is available to the plurality of manufacturing processes, a method for preparing a manufacturing plan according to the present invention determines an assignment of the manufacturing equipment to the manufacturing processes through the following steps. Firstly, a manufacturing equipment is temporarily assigned to each of the manufacturing processes to determine a supposed operation pattern for the day. Then, work load of each manufacturing process of the day is allotted among the manufacturing equipments assigned to the manufacturing process. Thereafter, total load of each manufacturing equipment is calculated by summing up the work load allotted from the manufacturing processes. Using the total load thus calculated, a capability index of each manufacturing equipment is determined by dividing capacity of the manufacturing equipment of the day by the total load of the manufacturing equipment. Then, the capability index of the manufacturing equipment is multiplied with the work load allotted from the manufacturing process to the manufacturing equipment to provide a feasible load of the manufacturing equipment for the manufacturing process. By summing up the feasible load of each manufacturing equipment, a total feasible load of the day under the above supposed operation pattern is calculated for each manufacturing process. By comparing the total feasible load with the work load of the day for each manufacturing process, the supposed operation pattern is determined whether acceptable or not.

In a manufacturing factory charged with a plurality of manufacturing processes and having a plurality of manufacturing equipments each of which is available to the plurality of manufacturing processes, moreover, a method for preparing a manufacturing plan according to the present invention determines an assignment of the manufacturing equipment to the manufacturing processes through the following steps. Firstly, the manufacturing equipment is assigned to the manufacturing processes to determine an operation pattern for the day. Then, work load of each manufacturing process of the day is allotted among the manufacturing equipment assigned to the manufacturing process. Thereafter, total load of each manufacturing equipment is calculated by summing up the work load allotted from the manufacturing processes. Using the total load thus calculated, a capability index of each manufacturing equipment is determined by dividing capacity of the manufacturing equipment of the day by the total load of the manufacturing equipment. Then, the capability index of the manufacturing equipment is multiplied with the work load allotted from the manufacturing process to the manufacturing equipment to provide a feasible load of the manufacturing equipment for the manufacturing process. By summing up the feasible load of each manufacturing equipment, a total feasible load of the day under the above operation pattern is calculated for each manufacturing process. The above steps are repeated for all possible operation patterns in which assignment of the manufacturing equipment are different each other. For all the possible operation patterns, the total feasible load thus calculated is compared with the work load of the day for each of the manufacturing processes. The possible operation pattern, in which difference between the total feasible load and the work load of the day is the smallest, is adopted as the operation pattern for the day.

Further, a method for manufacturing semiconductor products according to the present invention is characterized in that the method for preparing a manufacturing plan according to the present invention is applied thereto.

According to the present invention, it is possible to calculate, in a manufacturing factory provided with a plurality of manufacturing processes and a plurality of manufacturing equipments, the manufacturing capability for each of these processes easily and rapidly, thereby appropriately assigning these equipment to each of these processes. It is, therefore, possible to efficiently utilize the manufacturing equipment without imbalance between the load and the capability for each of the manufacturing processes even in such a manufacturing factory that the load for each of these processes would fluctuate with a customer's order for each product.

Further, according to the present invention, it is possible to refer the manufacturing capability and the load for each manufacturing process at the same time to thereby discuss previously an assignment of the manufacturing equipment for the day or the next day onward. Also, it is possible, for example, to focus particularly on management for such a manufacturing process that has a large ratio of the load against the capability, thus securely managing the processes efficiently. Further, it is possible to predict a shipment date if more orders are received, based on the ratio of the load against the capability, thus deciding whether the orders should be accepted or not.

These and other objects, advantages and features of the present invention will become more apparent from the following description and the accompanying drawings.

BRIEF DESCRIPTION OF THE DRAWINGS

FIG. 1 is a table showing an assignment of the manufacturing equipment to the manufacturing processes;

FIG. 2 is a table showing capability of the manufacturing line for each manufacturing process determined by the method according to the present invention;

FIG. 4 is a table showing capability of the manufacturing line for each manufacturing process with another assignment of the manufacturing equipment;

FIG. 5 is a table showing another assignment of the manufacturing equipment;

FIG. 6 is a table showing capability of the manufacturing line for each manufacturing process with yet another assignment of the manufacturing equipment;

FIGS. 7(a) and 7(b) are tables showing the method for preparing a manufacturing plan according to the present invention in which assignment of the manufacturing equipment varies from day to day;

FIG. 8 is a table showing capability of the manufacturing line for each manufacturing process with still another assignment of the manufacturing equipment;

FIG. 10 is a table showing applicability of the manufacturing equipment to the manufacturing processes.

DETAILED DESCRIPTION

Figure 3:
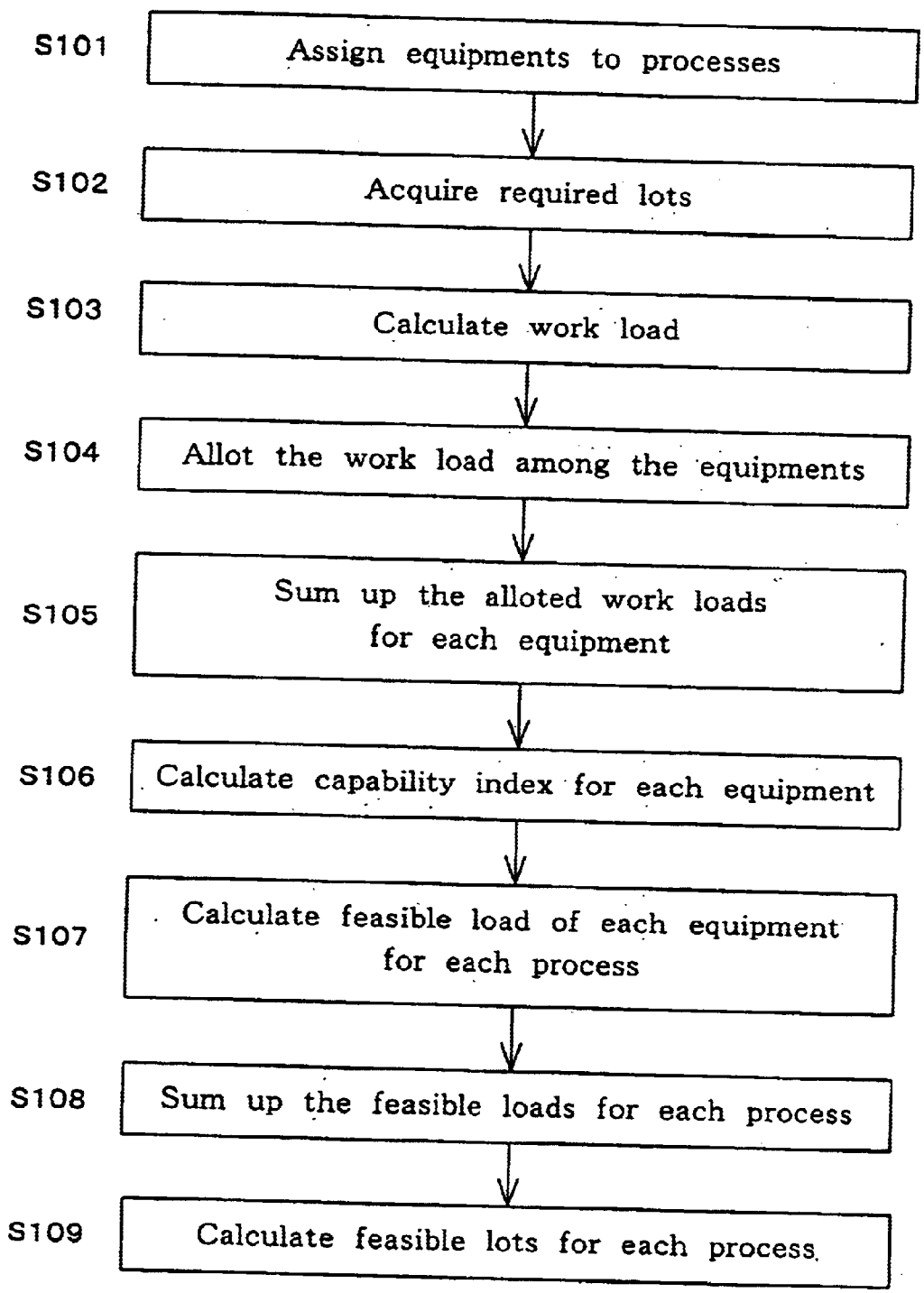
FIG. 3 is a flowchart showing the method for preparing a manufacturing plan according to the present invention.

The following will describe embodiments of the present invention with reference to the accompanying drawings.

Embodiment 1

Hereinafter, a method for preparing a manufacturing plan according to the present invention is described with reference to a flowchart of FIG. 3 and tables of FIGS. 1 and 2. Although a manufacturing plan generally includes a variety of items, for example, an operating schedule of the manufacturing equipment, a maintenance plan of facilities, utilization of resources such as personnel and materials, and inventory management, the present invention focuses particularly on the manufacturing capacity of the manufacturing line (or manufacturing factory) which constitutes a basis for these items and relates to the assignment of the manufacturing equipment to the manufacturing processes according to the load of each manufacturing process.

As described above, the manufacturing line (or manufacturing factory) is equipped with a plurality of manufacturing equipments and charged with a plurality of manufacturing processes. Therefore, when preparing a manufacturing plan according to the present invention, it is necessary to know the relationship between the assignment of manufacturing equipment and capacity of the manufacturing line. That is, for each manufacturing process, it is necessary to now how the capacity of the manufacturing line is affected by varying the assignment of the manufacturing equipment.

Consequently, an assignment of the manufacturing equipment, that is, an association of each manufacturing equipment with the manufacturing processes is temporarily determined to calculate a capacity of the manufacturing line for each manufacturing process. As already described with reference to FIG. 10, the manufacturing equipments M1, M2, M3, M4, and M5 are available for the plurality of manufacturing processes, respectively. In the present embodiment, the manufacturing equipments M1, M2, M3, M4, and M5 are assigned to the manufacturing processes P1, P2, P3, and P4, respectively as shown in a table of FIG. 1 (step S101 of FIG. 3).

The assignment, that is, the association of each manufacturing equipment with the manufacturing processes is indicated by the check-mark at an intersection of a row (manufacturing equipment) and a column (manufacturing process) in the table of FIG. 1. That is, in an example of FIG. 1, the manufacturing equipment M1 is assigned to the manufacturing processes P1 and P4, while the manufacturing equipment M2 is assigned to the manufacturing process P2. Also, the manufacturing equipment M3 is assigned to the manufacturing processes P2, P3, and P4, the manufacturing equipment M4 is assigned to the manufacturing process P1, and the manufacturing equipment M5 is assigned to the manufacturing process P1 and P3, respectively. In other words, the manufacturing process P1 is shared by the manufacturing equipments M1, M4, and M5, the manufacturing process P2 is shared by the manufacturing equipments M2 and M3, the manufacturing process P3 is shared by the manufacturing equipments M3 and M5, and the manufacturing process P4 is shared by the manufacturing equipments M1 and M3, respectively.

Next, for each manufacturing process, the number of required lots to be processed on the day is determined (step S102 of FIG. 3). The number of required lots is defined, for example, as a number of semi-finished lots which are finished in previous process in the previous day. It might be defined also as, for example, a 90% indication of a daily production achievement which is given on the basis of the achievement of up to the previous day or month in each manufacturing process. In this embodiment, as shown in an example of FIG. 2, as the number of required lots to be processed, 50 lots are required for the manufacturing process P1, and 50 lots, 100 lots, and 150 lots are required for the manufacturing processes P2, P3, and P4 respectively.

It takes a certain time lapse to complete each manufacturing process, and it is indicated as a processing time in the table of FIG. 2. The processing time is given in units of one "minute/lot", so that, as can be seen from FIG. 2, it takes 30 minutes to finish a lot in the manufacturing process P1, while it respectively takes 60 minutes, 15 minutes, and 10 minutes to finish a lot in the manufacturing process P2, P3, and P4.

By multiplying the number of required lots and the processing time, therefore, the work load of the day can be calculated for each manufacturing process (step S103 of FIG. 3). The load is given in units of one minute, so that, in the example of FIG. 2, the work load of the day is processing of 1500 minutes for manufacturing process P1.

Next, thus calculated work load of the day is allotted to each of the manufacturing equipments (step S104 of FIG. 3 and an arrow Q in FIG. 2). For example, as shown in assignment of FIG. 1, the manufacturing process P1 is shared by the three manufacturing equipments M1, M4, and M5. Therefore, the work load of the day for the manufacturing process P1, that is, the work load of 1500 minutes is evenly allotted to these three manufacturing equipments M1, M4, and M5. Eventually, these three equipments are each charged with load of 500 minutes. Likewise, for the manufacturing processes P2, P3, and P4, the work load of the day is allotted to each of the manufacturing equipments.

Subsequently, for each manufacturing equipment, the work load thus allotted from each manufacturing process are summed up to calculate a load of each manufacturing equipment (step S105 of FIG. 3). For example, the manufacturing equipment M1 is utilized for the manufacturing processes P1 and P4, and charged with load of 500 minutes from the manufacturing process P1 and load of 750 minutes from the manufacturing process P4, respectively. Therefore, the load of the day for the manufacturing equipment M1 is 1250 minutes in total.

Next, a capability index, which is a ratio of daily capability to the load of the day, is calculated for each manufacturing equipment (step S106 of FIG. 3). The manufacturing equipment are all in operation around the clock except in a special situation such as a breakdown or a maintenance job, so that each has a processing capability of 1440 minutes (=60 minutes×24) for one day. It is, therefore, possible to divide "1440" minutes by the load of the day to thereby calculate a capability index, which indicates the degree of tolerance that each equipment has against the load. In the example of FIG. 2, the manufacturing equipment M1, for example, is allotted only 1250 minutes of the load and so has some tolerance against the processing capability of "1440 minutes" of the day. The capability index is, therefore, larger than 1. The manufacturing equipment M3, on the other hand, is allotted 3000 minutes of the load, which exceeds the processing capability of a "1440 minutes". The capability index is, therefore, less than 1.

If the capability index is thus larger than 1, the relevant equipment has a tolerance in processing over its allotment, whereas if the index is less than 1, the equipment cannot complete its allotment. The processible load that can actually be completed by the equipment in the day can be obtained by multiplying the work load allotted at step S104 by the capability index (step S107 of FIG. 3).

That is, since, for example, the manufacturing equipment M1 is allotted the load of 1250 minutes, which is the sum of the load of 500 minutes for the manufacturing process P1 and the load of 750 minutes for manufacturing process P4, so that the capability index is 1.152. Therefore, the equipment M 1 has a capability to process load of 576 minutes for the manufacturing process P1 and load of 864 minutes for the manufacturing process P4.

The manufacturing equipment M3, on the other hand, is allotted a load of 1500 minutes for the manufacturing process P2, a load of 750 minutes for the manufacturing process P3 and a load of 750 minutes for the manufacturing process P4, so that the load of the equipment M3 is 3000 minutes in total. The capability index, therefore, is 0.48, so that actually the equipment M3 only can process load of 720 minutes for the manufacturing process P2, load of 360 minutes for the manufacturing process P3, and load of 360 minutes for the manufacturing process P4.

Similarly to the above, processible load for each process is calculated for each manufacturing equipment. The calculated processible loads are summed up for each manufacturing process to thereby obtain the feasible load, that is, capability of the manufacturing line under the assignment of the equipment shown in FIGS. 1 and 2, for each of the processes P1, P2, P3, and P4 (step S108 of FIG. 3 and an arrow R in FIG. 2). Also, by dividing the feasible load of each manufacturing process by the above-mentioned processing time of each manufacturing process, it is possible to obtain the number of lots that can be processed in the day, that is, the number of feasible lots for each manufacturing process (step S109 of FIG. 3).

By comparing the obtained number of feasible lots to the number of required lots, it is possible to determine whether the required lots can be processed in the day. If the number of feasible lots is close to or exceeds the number of required lots, the assignment of the equipment temporarily determined at step S101 is acceptable as a manufacturing plan. If the number of feasible lots is far away from the number of required lots or shows that it is impossible to process the required lots, the steps can return to the beginning (step S101) of the flowchart of FIG. 3 to review the assignment of the manufacturing equipment. As shown in a table of FIG. 4, for example, by reviewing the assignment of the manufacturing equipment M3 and M4 for the manufacturing process P2, it is possible to make the number of feasible lots more closer to the number of required lots as compared with the assignment of FIG. 2.

If any of the manufacturing equipments cannot be operated due to a trouble or heavy maintenance, all the field of that equipment can be marked with "n/a" in the table of FIG. 10 and FIG. 1 so that no work load is allotted to that equipment. Also, if the equipment can be operated only for part of the day owing to a simple maintenance, the numerator "1440 minutes" in calculation of the capability index can be replaced by the operable time lapse of the equipment.

Also, in the above description, work load for each process is to be evenly allotted to each equipment. That is, the same amount of load is allotted to the three equipments M1, M4, and M5 that share the process P1. As indicated by numerals in the table of FIG. 5, however, a plurality of equipment might be charged with loads of certain proportion. The numerals in the table of FIG. 5 indicate that the equipments M1, M4, and M5 share the work load for the process P1 at a ratio of 1:2:2. When the work load for each manufacturing process is allotted to the plurality of manufacturing equipments at a ratio shown in FIG. 5, the capability of the manufacturing line for each manufacturing process is calculated as shown in FIG. 6, thus bringing the number of feasible lots close to the required lots as compared to the assignment shown in FIGS. 1 and 2.

The above-mentioned calculation of the capability of manufacturing line can of course be performed manually but might be performed more easily by utilizing a dedicated computer program or spreadsheet software. Also, a computer can be used to repeat processing of steps S101 through S109 until the difference between the number of feasible lots and that of the required lots for the day becomes less than a predetermined value. Further, a computer might be used to perform calculations for all possible assignments (that is, assignment of each equipment to each process) with variously changing the allotment of the work load to each equipment, to thereby discover such an assignment and allotment that the difference between the number of feasible lots and that of the required lots might become less than a predetermined value or minimized as a preferable manufacturing plan.

As described above, according to the present embodiment, for a manufacturing factory for performing a plurality of manufacturing processes by using a plurality of manufacturing equipments, the manufacturing capability for each manufacturing process is calculated through a simple method to determine a manufacturing plan based on the result of calculation. It is, therefore, possible to easily assign each of the manufacturing equipment to the manufacturing processes according to the work load, so that a manufacturing plan in which the manufacturing equipment are efficiently utilized is easily prepared.

Embodiment 2

A method for preparing a manufacturing plan according to Embodiment 1 of the present invention can be applied to the preparation of a manufacturing plan over a constant period such as one week or month.

Suppose, for example, that as the number of required lots for continuous four days, 200 lots is required for the manufacturing process P1, while 200 lots, 400 lots, and 600 lots are required for the manufacturing processes P2, P3, and P4, respectively.

In this case, when the manufacturing equipments are operated for these four days in such an operation pattern, that is, assignment of the equipment as shown in FIG. 4, the number of the feasible lots for each manufacturing process will be totaled to the number as shown in FIG. 7(a), thus resulting in too large difference from the number of required lots. Consequently, suppose that the equipments are operated in such an operation pattern as shown in FIG. 4 for the first two days and, for the remaining two days, the equipments are operated in such assignment thereof to each of the manufacturing processes as shown in FIG. 8. As a result, as shown in FIG. 7(b), it is possible to reduce the difference between the number of required lots and the feasible lots as compared to that in the case where the equipment are operated in a pattern of FIG. 4 for four days, when the four days are considered as a unit.

Thus, according to the present embodiment, a plurality of operation patterns with different assignment of the manufacturing equipment to each of the manufacturing processes are combined to thereby bring the manufacturing capability of manufacturing line for each manufacturing process in a predetermined period close to a required value eventually. It is, therefore, unnecessary to consider a complicated operation pattern, so that simple operation patterns can be combined to realize a required process capability, thus facilitating the preparation of a manufacturing plan and the operation management of the manufacturing equipment in the factory.

Embodiment 3

Figure 9:
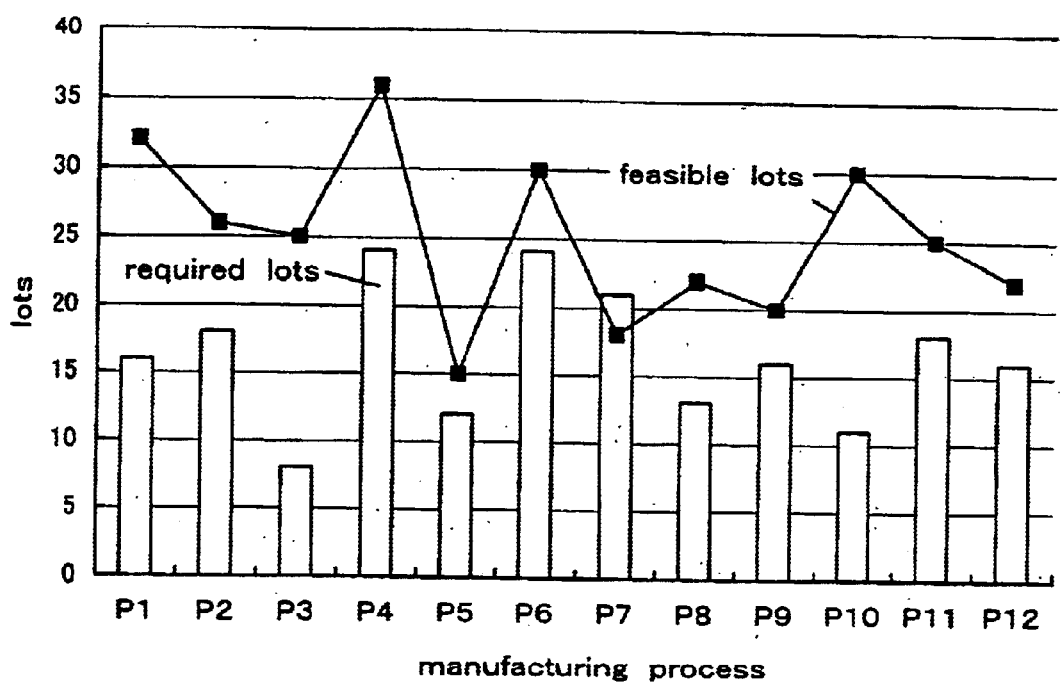
FIG. 9 shows an example of a display screen in which the number of the feasible lots, determined by the method according to the present invention, and the number of required lots are displayed together.

According to Embodiments 1 and 2 of the present invention, it makes possible to calculate the process capability for each manufacturing process by determining the assignment of each manufacturing equipment. In this embodiment, on the other hand, as shown in FIG. 9, the calculated capability for each manufacturing process and the work load for each manufacturing process in the day are displayed on a display screen simultaneously.

Since excess or deficiency of the manufacturing capability against the work load can be easily comprehended for each manufacturing process, it is possible to prepare an appropriate manufacturing plan promptly accommodating to fluctuations in the work load on a real time. Also, changes in the capability for each manufacturing process with the change of operation pattern, that is, assignment of the manufacturing equipment, can be reflected to appear on the display screen immediately, thus facilitating the preparation of the manufacturing plan. Further, as described with Embodiment 2 of the present invention, based on excess or deficiency of the capability for each process against the work load of the day, the manufacturing plan from the next day onward can be decided in such a manner as to bring the manufacturing capability in a predetermined period close to a required value.

Also, the calculated capability for each manufacturing process and the work load of each manufacturing process in the day might be provided viewable for a Web browser on terminals connected via a network. It is possible to comprehend the relationship between the load and the capability on a real time at each manufacturing line, at each manufacturing equipment or anywhere in a factory, to thereby manage the manufacturing equipment more efficiently. Also, it is possible to decide an amount of orders that can be accepted after knowing the load and capability for each process in status quo, to enhance the operating rate of the factory as a whole and also avoid delaying the shipment owing to acceptance of excessive orders.

While preferred embodiments of the present invention have been described, such descriptions are for illustrative purposes only, and it is to be understood that changes and variations might be made without departing from the sprit or scope of the present invention.

What is claimed is:

1. A method for preparing a manufacturing plan, for a manufacturing factory charged with a plurality of manufacturing processes and having a plurality of manufacturing equipments, each of which is available for the plurality of manufacturing processes, for determining an assignment of the manufacturing equipments to the manufacturing processes, comprising:

temporarily assigning the manufacturing equipment to the manufacturing processes to determine a supposed operation pattern for a day, allotting work load of each manufacturing process of the day among the manufacturing equipment assigned to the manufacturing process, calculating total load of each manufacturing equipment by summing the work load allotted from the manufacturing processes, calculating a capability index by dividing capacity of each manufacturing equipment of the day by the total load of each manufacturing equipment, multiplying the capability index of each manufacturing equipment by the work load allotted from each manufacturing process to the manufacturing equipment together to provide a feasible load of each manufacturing equipment for the manufacturing process, summing the feasible load of each manufacturing equipment to provide a total feasible load of the day for the manufacturing process, and comparing the total feasible load with the work load of the day for each manufacturing process to determine acceptability of the supposed operation pattern.

2. The method for preparing a manufacturing plan of claim 1, wherein the supposed operation pattern is determined to be acceptable when difference between the total feasible load and the work load of the day is smaller than a predetermined value.

3. A method for preparing a manufacturing plan, for a manufacturing factory charged with a plurality of manufacturing processes and having a plurality of manufacturing equipments, each of which is available to the plurality of manufacturing processes, for determining an assignment of the manufacturing equipments to the manufacturing processes, comprising:

assigning the manufacturing equipment to the manufacturing processes to determine an operation pattern, and determining all possible operation patterns by varying assignment of the manufacturing equipment, for all the possible operation patterns, allotting work load of each manufacturing process of a day among the manufacturing equipment assigned to the manufacturing process, calculating total load of each manufacturing equipment by summing the work load allotted from each manufacturing processes, calculating a capability index by dividing capacity of each manufacturing equipment of the day by the total load of each manufacturing equipment, multiplying the capability index of each manufacturing equipment by the work load allotted from the manufacturing process to the manufacturing equipment together to provide a feasible load of the manufacturing equipment for the manufacturing process, and summing the feasible load of each manufacturing equipment to provide a total feasible load of the day for the manufacturing process, for all the possible operation patterns, comparing the total feasible load with the work load of the day for each of the manufacturing processes, and adopting the operation pattern, in which difference between the total feasible load and the work load of the day is smallest, as the operation pattern for the day.

4. The method for preparing a manufacturing plan of claim 1, wherein the total feasible load and the work load of the day for each manufacturing process are simultaneously viewable.

5. A method for manufacturing semiconductor products employing a method for preparing a manufacturing plan, for a manufacturing factory charged with a plurality of manufacturing processes and having a plurality of manufacturing equipments, each of which is available to the plurality of manufacturing processes, for determining an assignment of the manufacturing equipments to the manufacturing processes, the method for preparing a manufacturing plan comprising:

temporarily assigning the manufacturing equipment to the manufacturing processes to determine a supposed operation pattern for a day, allotting work load of each manufacturing process of the day among the manufacturing equipment assigned to the manufacturing process, calculating total load of each manufacturing equipment by summing the work load allotted from the manufacturing processes, calculating a capability index by dividing capacity of the manufacturing equipment of the day by the total load of the manufacturing equipment, multiplying the capability index of the manufacturing equipment by the work load allotted from the manufacturing process to the manufacturing equipment together to provide a feasible load of the manufacturing equipment for the manufacturing process, summing the feasible load of each manufacturing equipment to provide a total feasible load of the day for the manufacturing process, and comparing the total feasible load with the work load of the day for each manufacturing process to determine acceptability of the supposed operation pattern.

* * * * *